(12) United States Patent
Kim et al.

(10) Patent No.: US 7,684,435 B2
(45) Date of Patent: Mar. 23, 2010

(54) BASE STATION SYSTEM FOR MOBILE COMMUNICATION

(75) Inventors: Ki-Chul Kim, Suwon-shi (KR); Sung-Jun Baik, Daejeon-Kwangyokshi (KR)

(73) Assignees: Samsung Electronics Co., Ltd., Suwon-si (KR); Airpoint Co., Ltd., Daejeon-Kwangyokshi (KR)

( * ) Notice: Subject to any disclaimer, the term of this patent is extended or adjusted under 35 U.S.C. 154(b) by 2048 days.

(21) Appl. No.: 10/459,542

(22) Filed: Jun. 12, 2003

(65) Prior Publication Data
US 2004/0004943 A1    Jan. 8, 2004

(30) Foreign Application Priority Data
Jul. 2, 2002    (KR) ................. 10-2002-0037915

(51) Int. Cl.
*H04J 3/16*    (2006.01)
*H04J 3/22*    (2006.01)
*H04B 1/38*    (2006.01)
*H04J 3/24*    (2006.01)
*H04M 1/00*    (2006.01)

(52) U.S. Cl. .................. 370/466; 370/474; 455/560; 455/561

(58) Field of Classification Search ......... 370/320–339, 370/465–474, 310, 340, 395.5; 455/560, 455/561

See application file for complete search history.

(56) References Cited

U.S. PATENT DOCUMENTS

| | | | | |
|---|---|---|---|---|
| 5,537,458 A | * | 7/1996 | Suomi et al. | ............. 455/556.1 |
| 5,577,026 A | * | 11/1996 | Gordon et al. | .............. 370/278 |
| 5,577,196 A | * | 11/1996 | Peer | ............................. 714/4 |
| 5,634,191 A | * | 5/1997 | Beasley | ....................... 370/279 |
| 5,734,979 A | * | 3/1998 | Lu et al. | ..................... 455/445 |

(Continued)

FOREIGN PATENT DOCUMENTS

| | | |
|---|---|---|
| JP | 11-27272 | 1/1999 |
| JP | 2002-152242 | 5/2002 |

OTHER PUBLICATIONS

*Office Action* from the Japan Patent Office issued in Applicant's corresponding Korean Patent Application No. 10-2002-0037915 dated Nov. 8, 2005.

*Primary Examiner*—Kevin C Harper
*Assistant Examiner*—Xavier Szewai Wong
(74) *Attorney, Agent, or Firm*—H.C. Park & Associates, PLC

(57) ABSTRACT

A base station system for mobile communication between a mobile terminal and a base station controller, the base station system utilizing a digital modem unit for receiving a signal to be transmitted to the mobile terminal from the base station controller, framing the received signal according to a frame format for transmission different than an Ethernet specified data format, the frame format being a predetermined remote RF (radio frequency) unit frame, the digital modem unit transmitting a plurality of the remote RF unit frames in series over an Ethernet using twisted pair cable, at least one remote RF unit hub receiving the remote RF unit frames transmitted by the digital modem unit and distributing the received remote RF unit frames to a plurality of remote RF units via the Ethernet using twisted pair cable, and the plurality of remote RF units producing a deframed signal by deframing the remote RF unit frames received from the remote RF unit hub, modulating the deframed signal to an RF signal, and transmitting the RF signal to the mobile terminal, wherein the remote RF unit frames are divided into a traffic frame for use in transmitting traffic data, which is transmitted and received by the mobile terminal and a control frame for use in transmitting a control address and control data, the control address differentiating the plurality of remote RF units from one another, the control data containing a command to control operation and functions of the plurality of remote RF units.

22 Claims, 6 Drawing Sheets

U.S. PATENT DOCUMENTS

| | | | |
|---|---|---|---|
| 5,790,528 A * | 8/1998 | Muszynski | 370/331 |
| 5,796,742 A * | 8/1998 | Klotzbach et al. | 370/466 |
| 5,809,395 A * | 9/1998 | Hamilton-Piercy et al. | 725/106 |
| 5,890,055 A * | 3/1999 | Chu et al. | 455/16 |
| 6,032,020 A * | 2/2000 | Cook et al. | 455/7 |
| 6,058,317 A * | 5/2000 | Posti | 455/561 |
| 6,192,216 B1 * | 2/2001 | Sabat et al. | 455/507 |
| 6,259,910 B1 * | 7/2001 | Fairfield et al. | 455/422.1 |
| 6,359,871 B1 * | 3/2002 | Chung et al. | 370/338 |
| 6,421,330 B1 * | 7/2002 | Chung et al. | 370/335 |
| 6,470,053 B1 * | 10/2002 | Liu | 375/257 |
| 6,650,649 B1 * | 11/2003 | Muhammad et al. | 370/402 |
| 6,690,662 B1 * | 2/2004 | Komara et al. | 370/342 |
| 6,901,061 B1 * | 5/2005 | Joo et al. | 370/335 |
| 6,985,451 B1 * | 1/2006 | Nattiv et al. | 370/277 |
| 7,212,837 B1 * | 5/2007 | Calhoun et | 455/560 |
| 7,532,611 B1 * | 5/2009 | Jacks, Jr. | 370/349 |
| 2002/0021679 A1 * | 2/2002 | Paneth et al. | 370/330 |
| 2002/0089958 A1 * | 7/2002 | Feder et al. | 370/338 |
| 2002/0101842 A1 * | 8/2002 | Harrison et al. | 370/338 |
| 2002/0132619 A1 * | 9/2002 | Wiedeman et al. | 455/427 |
| 2003/0012158 A1 * | 1/2003 | Jin et al. | 370/335 |
| 2003/0055975 A1 * | 3/2003 | Nelson et al. | 709/227 |
| 2003/0152063 A1 * | 8/2003 | Giese et al. | 370/349 |
| 2004/0136336 A1 * | 7/2004 | Nakamura et al. | 370/328 |
| 2007/0230426 A1 * | 10/2007 | Beach | 370/338 |

* cited by examiner

BASE STATION SYSTEM FOR MOBILE COMMUNICATION

CLAIM OF PRIORITY

This application makes reference to, incorporates the same herein, and claims all benefits accruing under 35 U.S.C. §119 from an application entitled BASE STATION SYSTEM FOR MOBILE COMMUNICATION earlier filed in the Korean Industrial Property Office on 2 Jul. 2002, and there duly assigned Serial No. 2002-37915 by that Office.

BACKGROUND OF THE INVENTION

1. Field of the Invention

The present invention relates to a system for mobile communication, and more particularly to a base station system for mobile communication.

2. Description of the Related Art

Typically, a cellular system for mobile communication comprises a plurality of mobile terminals for transmitting and receiving users' signals, a base station part, the Base Transceiver Station (BTS) for relaying the transmission and reception signal of the plurality of mobile terminals via an appropriate process, a base station controlling part, the Base Station Controller (BSC) for controlling a plurality of BTSs, and a Mobile Switching Center (MSC) connected to BSC, thereby comprising a network for mobile communication. The cellular system for mobile communication includes a plurality of base stations which have been installed mainly outdoors. According to the respective base stations, service ranges, that is, the area of coverage, are set to provide speech-centered services to the users. The base stations may be often installed indoors, and data services as well as speech services may be further provided to the users.

Meanwhile, in terms of mobile communication, a repeater system is used for clearing shadows of radio waves, the shadows occurring in underground areas of buildings or inside steel frame structures, or for extending the coverage of certain regions. The repeater system connects a plurality of radio wave repeaters with a base system using optical lines or coaxial cables, and relays the signals which are transmitted and received between the base system and a mobile terminal. Such repeater systems which use the optical lines or coaxial cables have an advantage of transmitting and receiving a high quality of signal, owing to little loss in the lines and noise-reduction performance. However, in using such repeater systems, high costs of relevant units as well as optical lines or coaxial cables, and difficult and costly installation thereof are shortcomings. As a result, an entire base system requires high costs in terms of installation, maintenance and management. In addition, since conventional repeater systems perform a function of extending only the coverage, it is impossible to extend wireless channel capacities using such conventional repeater systems.

SUMMARY OF THE INVENTION

Therefore, the present invention has been made in view of the above problems, and it is an object of the present invention to provide a base station system for mobile communication, enabling transmission of a high quality of signal between a base station and a remote RF unit (RRU), through a line which can be installed cheaply and easily, the remote RF unit being installed remotely from the base station, the remote RF unit transceiving an RF (radio frequency) signal with a mobile terminal.

It is another object of the present invention to provide a base station system for mobile communication, which is able to flexibly extend a wireless channel capacity as well as coverage.

In accordance with the present invention, the above and other objects can be accomplished by the provision of a base station system for mobile communication, comprising a digital modem unit (Digital modem unit), at least one or more remote RF unit (RRU) hubs and a plurality of remote RF units, the digital modem unit being interconnected with at least one or more remote RF unit hubs via Ethernet using a twisted pair cable, the remote RF unit hub being interconnected with the plurality of remote RF units via Ethernet using the twisted pair cable. The digital modem unit receives a signal, which is transmitted to a mobile terminal, from a base station controller (BSC) which is connected to a mobile exchange network. The digital modem unit performs framing of the received signal according to a frame format for transmission, where predetermined remote RF unit frames are set to be in series, and transmits a signal having the remote RF unit frames to a remote RF unit hub. The digital modem unit performs deframing of a signal having the remote RF unit frames which is received from a remote RF unit hub, according to the frame format for transmission, and then transmits the deframed signal to the base station controller. The remote RF unit hub receives a signal having the remote RF unit frames from the digital modem unit and distributes the received signal to the plurality of remote RF units. The remote RF unit hub performs multiplexing of a signal having the remote RF unit frames, which is received from the plurality of remote RF units, and transmits the multiplexed signal to the digital modem unit. The remote RF unit performs deframing of a signal having the remote RF unit frames which is received from a remote RF unit hub, according to the frame format for transmission, modulates a signal having the remote RF unit frames into an RF signal, and transmits the modulated signal to a mobile terminal. The remote RF unit demodulates an RF signal which is received from the mobile terminal, performs framing according to the frame format for transmission, and then transmits a signal having the remote RF unit frames to the remote RF unit hub.

The base station system for mobile communication in accordance with the invention further comprises a remote RF unit repeater, which is interconnected between a remote RF unit hub and a remote RF unit via Ethernet using a twisted pair cable for the purpose of extending a distance therebetween, for performing restoring, wave-shaping, and amplification of a signal having the remote RF unit frames which is transmitted between a remote RF unit hub and a remote RF unit. The remote RF unit repeater may not be necessary if the distance between the remote RF unit hub and the remote RF unit is short, so no signal amplification is necessary.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear.

Figure 1:
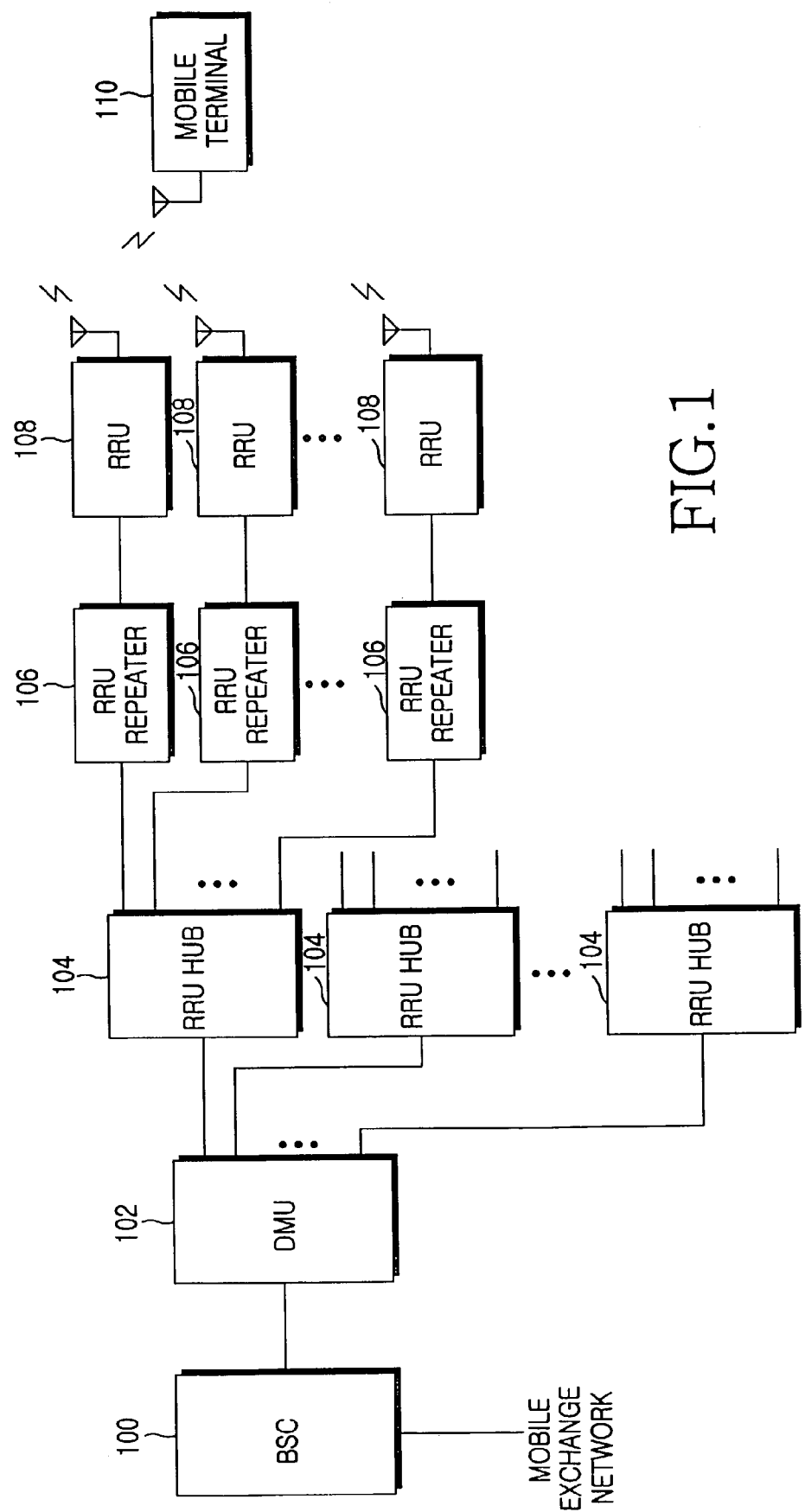
FIG. 1 is a block diagram showing a configuration of a base station system for mobile communication in accordance with the invention.

FIG. 1 is a block diagram showing a configuration of a base station system for mobile communication in accordance with the invention. A typical base station controller 100, which is connected to a mobile exchange network, is connected with a digital modem unit 102, while the digital modem unit 102 is connected with a plurality of remote RF unit hubs 104 via an Ethernet using a twisted pair cable. Each of the plurality of remote RF unit hubs 104 is connected with a plurality of remote RF units 108, which transceive an RF signal with a mobile terminal 110, through corresponding remote RF unit repeaters 106, among a plurality of remote RF unit repeaters 106, via the Ethernet using the twisted pair cable. The plurality of remote RF unit hubs 104 are separately connected with varying groups of the plurality of remote RF units 108 through the remote RF unit repeaters 106. Herein, there is illustrated only one remote RF unit hub 104 connected with remote RF unit repeaters 106 (if needed) and with the plurality of remote RF units 108, for convenience. Connection of the other remote RF unit hubs 104 with remote RF unit repeaters 106 and remote RF units 108 is not illustrated.

As described above, adopting Ethernet makes it possible to transmit a signal of high quality. In addition, using the twisted pair cable, instead of optical lines or coaxial cables, makes installation of a repeater system easier and the costs lower, compared to repeater systems using optical lines or coaxial cables. In Ethernet, the twisted pair cable is broadly divided into Unshielded Twisted Pair Cable (UTP) and Shielded Twisted Pair Cable (STP). UTPs may be used in Ethernet using standards of 10Base-T, 100Base-T, 1000Base-T, etc. STPs may be used in Ethernet using standards of 10Base-T, 100Base-TX, 1000Base-CX, etc.

Meanwhile, data transmission between a base station and a mobile terminal 110 should be accomplished in the form of a continuous stream. On the other hand, in Ethernet, data transmission is accomplished while being cut by a packet unit, thereby causing a signal cut-off problem. As a result, there is a problem in using an Ethernet frame for transmitting a radio signal. Considering such a problem, the invention adopts an independent frame format for transmission, where frames are set to be in series, as shown in the example in FIG. 2, not using an Ethernet frame. Hereafter such successive inventive frames will be referred to as "remote RF unit frames".

Figure 2:
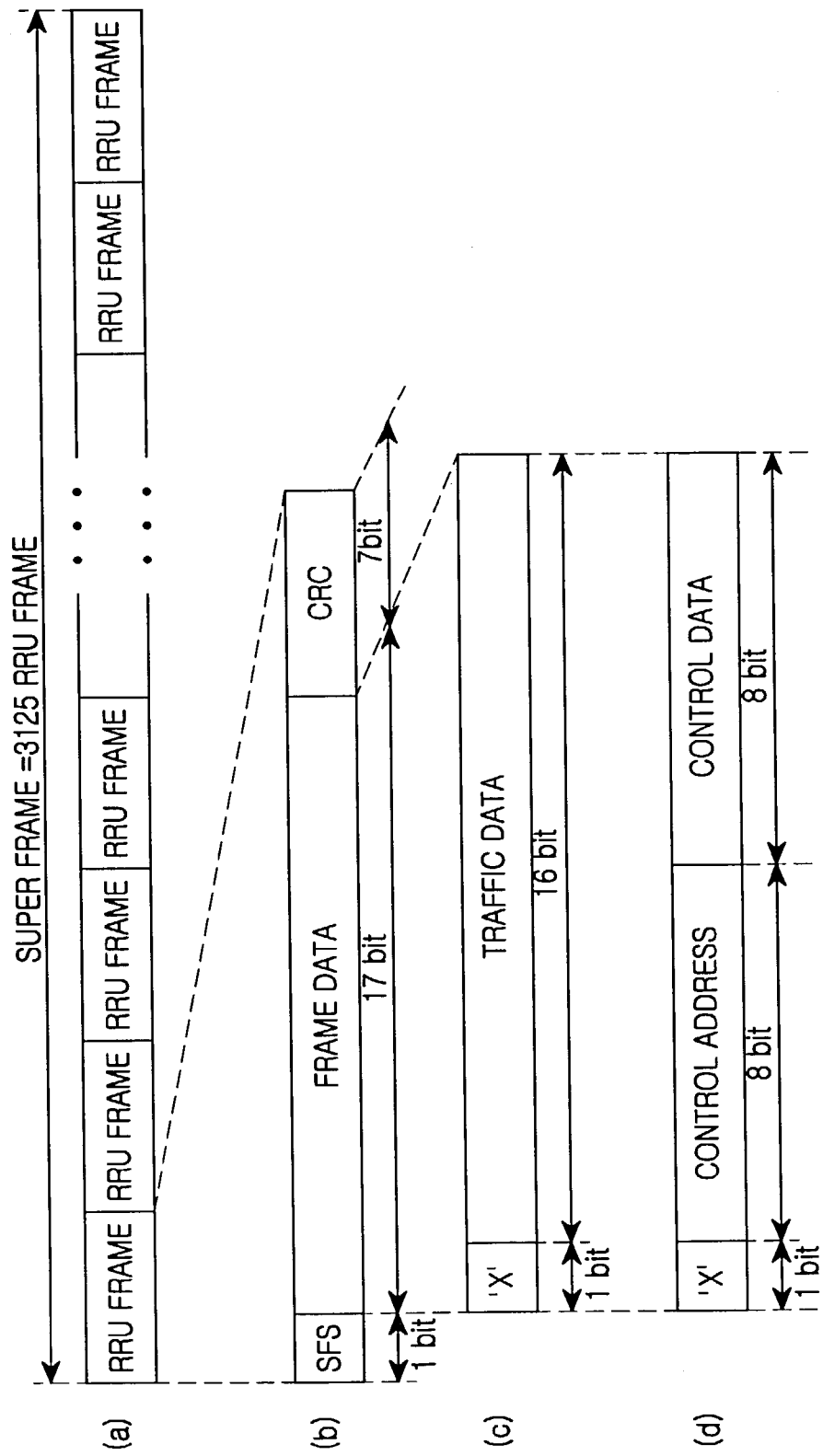
FIG. 2 is a view showing an example of a frame format in accordance with the invention.

In FIG. 2, showing a frame format for transmission, a plurality of remote RF unit (RRU) frames, for example, 3125 frames in (a) of FIG. 2, compose one super frame. Super frames are subsequently linked together, like remote RF unit frames. One remote RF unit frame, as shown in (b) of FIG. 2, comprises a synchronous field loading 1-bit super frame synchronous (SFS) bit, a data field loading 17-bit frame data, and a cyclic redundancy check (CRC) field loading a 7-bit cyclic redundancy check value. To detect errors on the data field, a generator polynomial of cyclic redundancy check, that is, $P(x)=x^7+x^3+1$, is used.

Such a remote RF unit frame may be divided into a traffic frame and a control frame, according to the frame data loaded on a data field. Regarding the traffic frame, traffic data having a 1-bit preliminary bit for bit arrangement and 16-bit traffic data are loaded on a data field, as shown in (c) of FIG. 2. As for the control frame, control data having a 1-bit preliminary bit for bit arrangement, 8-bit control address and 8-bit control data are loaded on a data field, as shown in (d) of FIG. 2.

The traffic frame is used in transmitting traffic data, which is transmitted and received between the base station controller 100 and the mobile terminal 110, that is, the data for speech call services or data communication services. For example, if one remote RF unit hub 104 is connected to eight remote RF units 108, and each remote RF unit 108 is assigned one traffic frame, the traffic frame corresponding to each remote RF unit 108 appears every 8th-frame, in the successive remote RF unit frames as shown in FIG. 2.

The control frame is used in transmitting a control address and control data. The control address and control data are used for the digital modem unit 102 to control operation and functions of the plurality of remote RF units 108 and check their states. The control address is an address for differentiating the plurality of remote RF units 108 from one another. Each remote RF unit 108 is given its characteristic control address. The control data is information comprising a command for digital modem unit 102 to control operation and functions of the plurality of remote RF units 108, and information that makes the plurality of remote RF units 108 report the result to the digital modem unit 102. Each control frame is inserted between the determined numbers of traffic frames.

The invention, as described above, adopts an independent frame format for transmission. As a result, although that the digital modem unit 102, remote RF unit hubs 104, remote RF unit repeaters 106, and remote RF units 108 are interconnected via Ethernet, as shown in FIG. 1, an Ethernet specified data format or a specified data format for an upper level Ethernet is not applied.

The base station controller 100 described above generally manages all wired and wireless resources which are necessary when hand-off calls, as well as common calls, between the base station and the mobile terminal 110 occur. In addition, the base station controller performs a variety of functions which are necessary for controlling calls. Such a base station controller 100 is connected to the digital modem unit 102.

The digital modem unit 102 receives a signal, which is transmitted from the base station controller 100 to the mobile terminal 110, performs framing of the received signal, according to the frame format of FIG. 2, for transmission, and transmits the signal to one of the remote RF unit hubs 104. The digital modem unit 102 also performs deframing of a signal having the remote RF unit frames which is received from one of the remote RF unit hubs 104, according to the frame format for transmission, and then transmits the deframed signal to the base station controller 100.

The remote RF unit hub 104 receives a signal having the remote RF unit frames from the digital modem unit 102 and distributes the received signal to the plurality of remote RF unit repeaters 106 which are connected therewith. The remote RF unit hub 104 also performs multiplexing of a signal having the remote RF unit frames, which is received from the plurality of remote RF units 108 through the remote RF unit repeaters 106, and transmits the multiplexed signal to the digital modem unit 102.

Each of the plurality of remote RF units 108 performs deframing of a signal having the remote RF unit frames which is received from the digital modem unit 102, through the remote RF unit repeaters 106 and the remote RF unit hubs 104, according to the frame format for transmission. The RF unit 108 then modulates a signal having the remote RF unit frames into an RF signal. The remote RF unit 108 then transmits the RF signal through an antenna to the mobile terminal 110.

The remote RF unit 108 also demodulates an RF signal which is received from the mobile terminal 110 through an antenna, performs framing according to the frame format for transmission of FIG. 2, and then transmits a signal having the remote RF unit frames to the remote RF unit hub 104 through the remote RF unit repeater 106.

The plurality of remote RF unit repeaters 106 are used for extending a distance between remote RF unit hubs 104 and the remote RF units 108. The remote RF unit repeaters 106 perform restoring, wave-shaping and amplification of a signal having the remote RF unit frames transmitted between the remote RF unit hub 104 and the remote RF unit 108. Use of the remote RF unit repeaters 106 may not be necessary if the distance between the remote RF unit hub 104 and the remote RF unit 108 is short, so no signal amplification is necessary.

For the digital modem unit 102, remote RF unit hub 104, remote RF unit repeater 106, and remote RF unit 108 described above, data coding methods vary depending on standards for Ethernet. A description of Ethernet adopting 100Base-T as an example of Ethernet using the twisted pair cable is below. 100Base-T uses a 4B/5B coding method for data coding, and a Multi Level Transmission-3 (MLT-3) coding method for line coding. According to this, serial data of a baseband to be transmitted comprises 4 bit-nibble units. Each 4-bit nibble is converted to a 5-bit signal having a transmission rate of 25 Mbps, that is, 5 lines of a Non-Return to Zero Inversion (NRZI) signal having an overall rate of 125 Mbps. The converted signal is reverted to a Non-Return to Zero (NRZ) signal, scrambled and then converted to a multi level transmission-signal. The multi level transmission-signal is transferred to the twisted pair cable.

Figure 3:
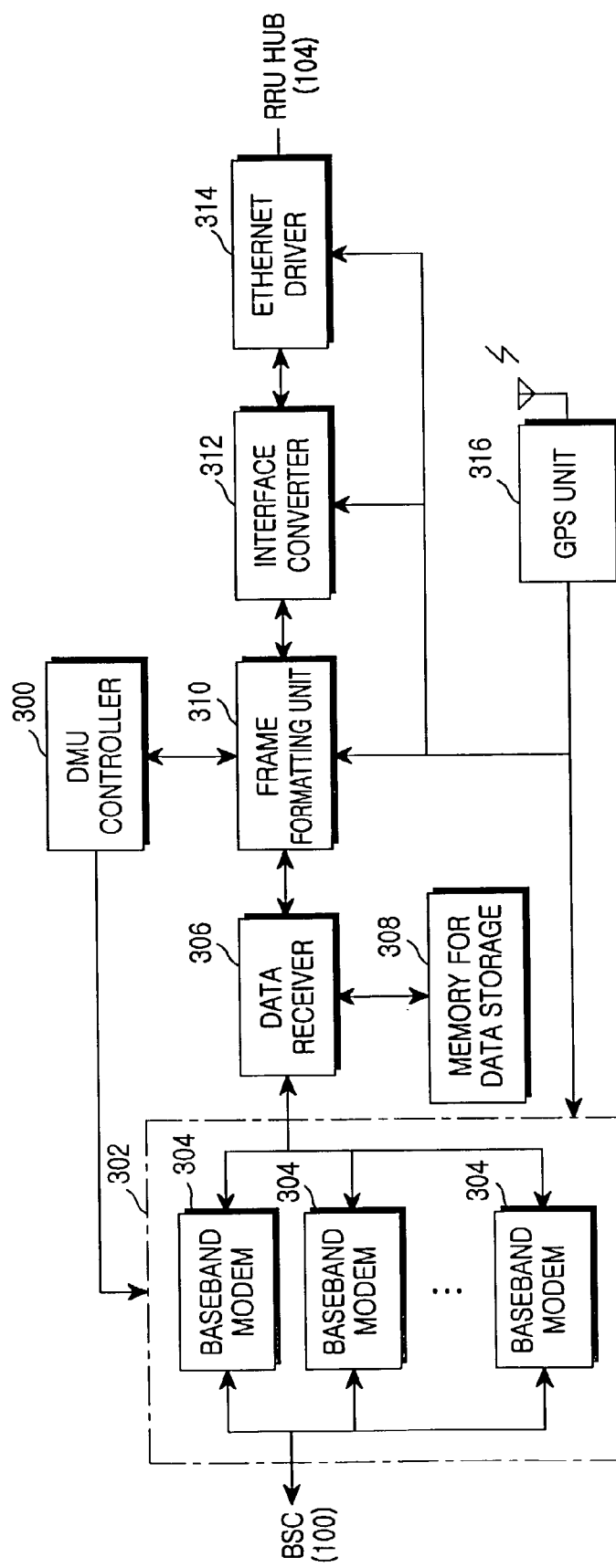
FIG. 3 is a block diagram showing a configuration of a digital modem unit in accordance with the invention.

FIG. 3 is a block diagram showing a configuration of a digital modem unit (DMU) 102 in accordance with the invention, upon adoption of Ethernet with a 100Base-T form. The digital modem unit comprises a digital modem unit controller 300, a baseband modulator/demodulator 302, a data receiver 306, a memory for data storage 308, a frame formatting unit 310, an interface converter 312, an Ethernet driver 314, and a global positioning system (GPS) unit 316.

FIG. 3 is an example showing a digital modem unit 102 connected to at least one remote RF unit hub 104. If the number of remote RF unit hubs 104 connected to the digital modem unit 102 increase, the configuration shown in FIG. 3 is additionally formed as many as the number of remote RF unit hubs.

The digital modem unit controller 300 controls the baseband modulator/demodulator 302 to perform modulation and demodulation according to channels. In addition, the digital modem unit controller 300 controls operation and functions of the plurality of remote RF units 108 through the frame formatting unit 310, using the control frame of FIG. 2, as described above.

The baseband modulator/demodulator 302 is, as known in the art, connected with a vocoder and transcoder included in the base station controller 100, and connected with the data receiver 306 as well. The baseband modulator/demodulator 302 includes a plurality of baseband modems 304 corresponding to respective channels. Such a baseband modulator/demodulator 302 receives a signal which is transmitted from the base station controller 100 to the mobile terminal 110, and demodulates the signal according to respective channels corresponding thereto, thereby obtaining traffic data of the baseband, followed by output to the data receiver 306. On the other hand, the baseband modulator/demodulator 302 receives an input of traffic data of the baseband from the data receiver 306 and modulates the received data according to respective channels corresponding thereto, followed by transmission of the modulated data to the base station controller 100.

The data receiver 306 is connected with the baseband modulator/demodulator 302 and the memory for data storage 308. The data receiver 306 receives an input of traffic data from the baseband modulator/demodulator 302, temporarily stores the data in the memory for data storage 308 and outputs the data in series to the frame formatting unit 310. On the other hand, the data receiver 306 temporarily stores traffic data which is transmitted from the frame formatting unit 310 to the baseband modulator/demodulator 302, and outputs the data to the baseband modulator/demodulator 302.

The frame formatting unit 310 receives an input of traffic data from the data receiver 306, performs framing according to the frame format for transmission of FIG. 2, and outputs a remote RF unit frame to the interface converter 312. On the other hand, the frame formatting unit 310 performs deframing of a remote RF unit frame received from the interface converter 312, according to the frame format for transmission of FIG. 2, and outputs the deframed data to the data receiver 306.

The interface converter 312 performs a 4B/5B coding of remote RF unit frame data framed by the frame formatting unit 310, performs scrambling and outputs to the Ethernet driver 314. On the other hand, the interface converter 312 performs descrambling of the data which is received from the remote RF unit hub 104 through the Ethernet driver 314, performs 4B/5B decoding, and then outputs a remote RF unit frame to the frame formatting unit 310.

The Ethernet driver 314 performs line coding of data which is converted by the interface converter 312, and transmits to the remote RF unit hub 104 through the twisted pair cable. On the other hand, the Ethernet driver 314 performs line decoding of a signal which is received from the remote RF unit hub 104 through the twisted pair cable and outputs to the interface converter 312.

The GPS unit 316, like a typical base transceiver station (BTS), receives time and clock information and synchronizes a clock (not shown). In the embodiment, the GPS unit 316 generates a transmission clock signal of 25 MHz depending on a 100Base-T standard, and transfers the transmission clock signal to the baseband modulator/demodulator 302, frame formatting unit 310, interface converter 312 and Ethernet driver 314. Accordingly, the digital modem unit 102 processes and transmits data synchronously to a transmission clock signal generated from the GPS unit 316.

Figure 4:
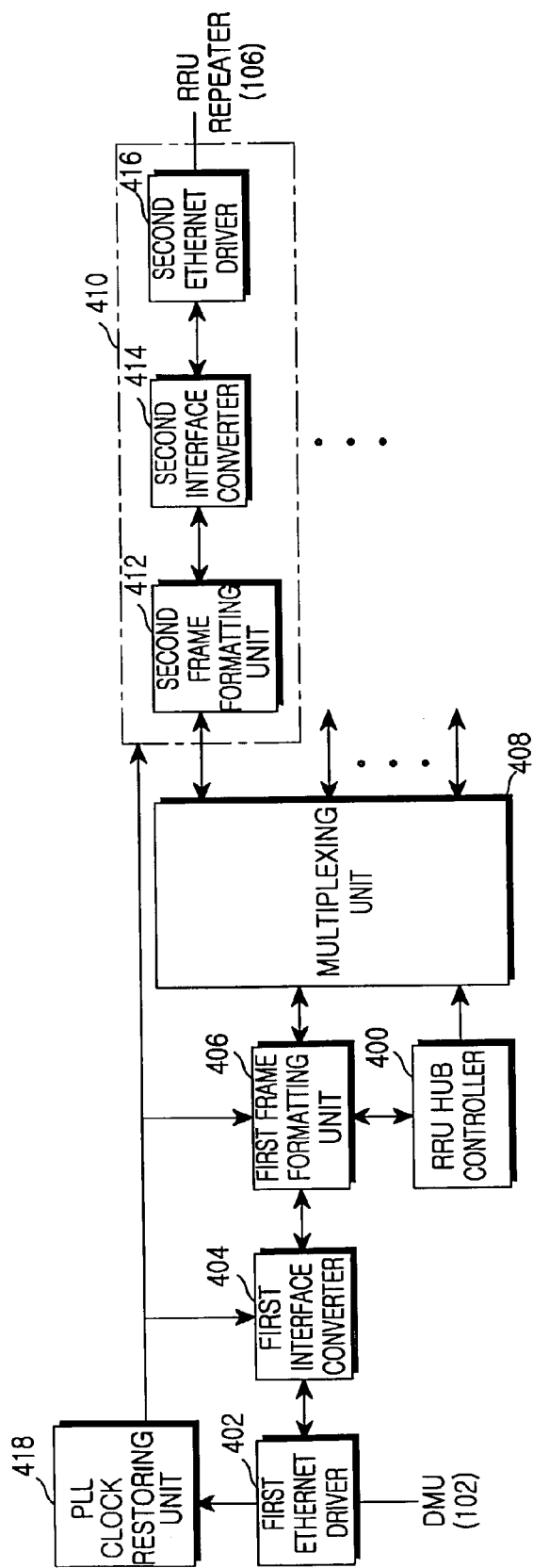
FIG. 4 is a block diagram showing a configuration of a remote RF unit hub in accordance with the invention.

FIG. 4 is a block diagram showing a configuration of a Remote RF Unit (RRU) hub 104 in accordance with the invention, upon adoption of Ethernet with a 100Base-T form. The remote RF unit hub 104 comprises a remote RF unit hub controller 400, a first Ethernet driver 402, a first interface converter 404, a first frame formatting unit 406, a multiplexing unit 408, a plurality of remote RF unit connection units 410, each of the remote RF unit connection units 410 being connected to a corresponding remote RF unit 108, among a plurality of remote RF units 108, and a phase locked loop (PLL) clock restoring unit 418. Each of the plurality of remote RF unit connection units 410 includes a second frame formatting unit 412, a second interface converter 414 and a second Ethernet driver 416.

The first Ethernet driver 402 performs line decoding of a signal which is received from the digital modem unit 102 through the twisted pair cable, and outputs to the first interface converter 404. On the other hand, the first Ethernet driver 402 performs line coding of data received from the first interface converter 404, and transmits to the digital modem unit 102 through the twisted pair cable.

The first interface converter 404 performs descrambling of data received from the first Ethernet driver 402, performs 4B/5B decoding, and outputs a remote RF unit frame to the first frame formatting unit 406. On the other hand, the first interface converter 404 performs 4B/5B coding of a remote RF unit frame received from the first frame formatting unit 406, performs scrambling, and outputs the scrambled signal to the first Ethernet driver 402.

The first frame formatting unit 406 performs deframing of a remote RF unit frame received from first interface converter 404, according to the frame format for transmission of FIG. 2, and outputs the deframed data to the multiplexing unit 408. On the other hand, the first frame formatting unit 406 performs framing of data received from the multiplexing unit 408, according to the frame format for transmission of FIG. 2, and a remote RF unit frame is outputted to the first interface converter 404.

The multiplexing unit 408 distributes data, received from the first frame formatting unit 406, to the plurality of remote RF unit connection units 410. On the other hand, the multiplexing unit 408 performs multiplexing of data received from the respective second frame formatting units 412 of the plurality of remote RF unit connection units 410, and outputs the multiplexed data to the first frame formatting unit 406. The remote RF unit hub controller 400 controls distribution and multiplex performance of the multiplexing unit 408.

The second frame formatting unit 412 performs framing of data received from the multiplexing unit 408, according to the frame format for transmission of FIG. 2, and the remote RF unit frame is outputted to the second interface converter 414. On the other hand, the second frame formatting unit 412 performs deframing of a remote RF unit frame received from second interface converter 414, according to the frame format for transmission of FIG. 2, and outputs to the multiplexing unit 408.

The second interface converter 414 performs 4B/5B coding of a remote RF unit frame received from the second frame formatting unit 412, performs scrambling and outputs to the second Ethernet driver 416. On the other hand, the second interface converter 414 performs descrambling of data received from the second Ethernet driver 416, performs 4B/5B decoding and outputs the remote RF unit frame to the frame formatting unit 412.

The second Ethernet driver 416 performs line coding of data received from the second interface converter 414, and outputs the line coded data to the remote RF unit repeater 106 connected with a corresponding remote RF unit 108, among the plurality of remote RF units 108, through the twisted pair cable. On the other hand, the second Ethernet driver 416 performs line decoding of a signal which is received from the remote RF unit repeater 106 connected with the corresponding remote RF unit 108, among the plurality of remote RF units 108, and outputs the line decoded signal to the second interface converter 414.

The PLL clock restoring unit 418 performs wave-shaping of a clock which is extracted from a signal having the remote RF unit frames by the first Ethernet driver 402, the signal having been received from the digital modem unit 102, and restores a transmission clock. The transmission clock was provided for the first and second interface converters 404 and 414, the first and second frame formatting units 406 and 412, and the second Ethernet driver 416. Accordingly, the remote RF unit hub 104, like the digital modem unit 102, processes and transmits data in sync with a transmission clock which is generated from the GPS unit 316 of the digital modem unit 102.

Figure 5:
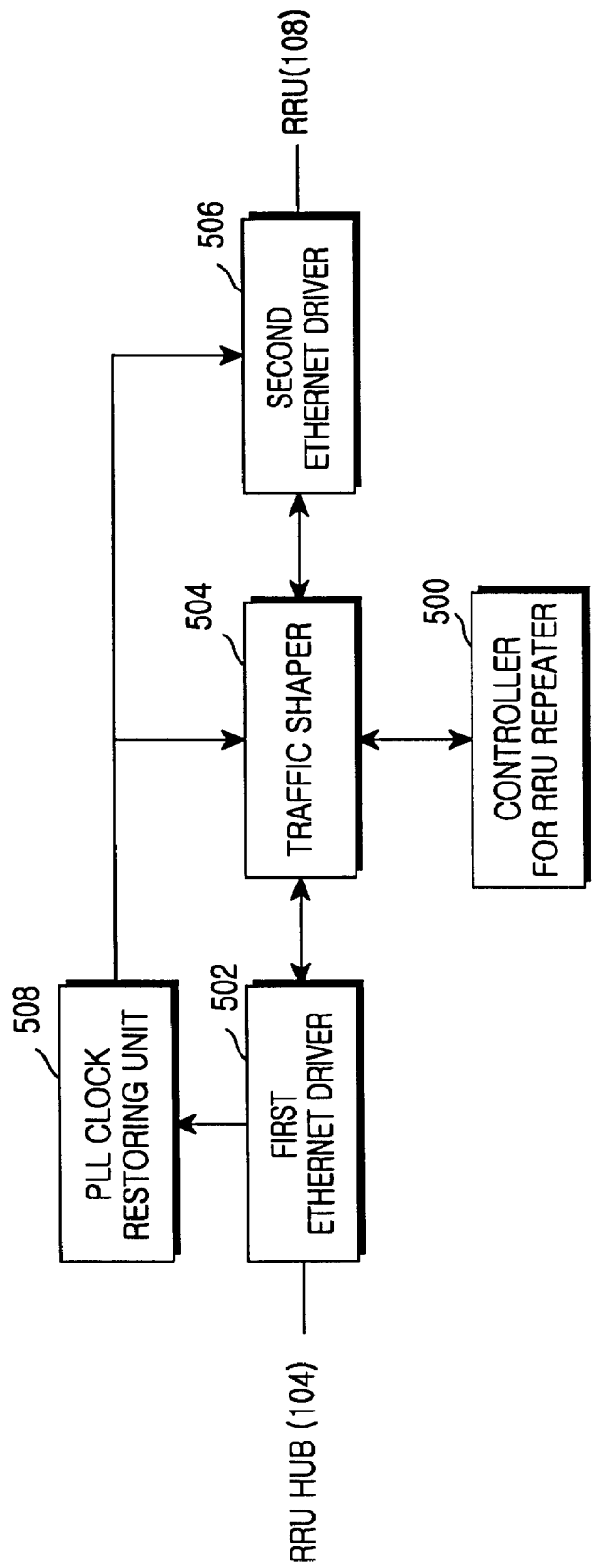
FIG. 5 is a block diagram showing a configuration of a remote RF unit repeater in accordance with the invention.

FIG. 5 is a block diagram showing a configuration of a remote RF unit repeater 106 in accordance with the invention, upon adoption of Ethernet with a 100Base-T standard. The remote RF unit repeater 106 comprises a controller for remote RF unit repeater 500, a first Ethernet driver 502, a traffic shaper 504, a second Ethernet driver 506, and a PLL clock restoring unit 508.

The first Ethernet driver 502 performs line decoding of a signal which is received from a corresponding remote RF unit hub 104, among the plurality of remote RF unit hubs 104, through the twisted pair cable, and outputs the line decoded signal to the traffic shaper 504. On the other hand, the first Ethernet driver 502 performs line coding of data received from the traffic shaper 504, and outputs the line coded data to a corresponding remote RF unit hub 104, among the plurality of remote RF unit hubs 104, through the twisted pair cable.

The traffic shaper 504 performs restoring, wave-shaping and amplification of data received from the first Ethernet driver 502, and outputs the amplified data to the second Ethernet driver 506. On the other hand, the traffic shaper 504 performs restoring, wave-shaping and amplification of data received from the second Ethernet driver 506, and outputs the amplified data to the first Ethernet driver 502. The controller for remote RF unit repeater 500 controls operation of the traffic shaper 504.

The second Ethernet driver 506 performs line coding of data received from the traffic shaper 504 and transmits the line coded data to a corresponding remote RF unit 108, among the plurality of remote RF units 108, through the twisted pair cable. On the other hand, the second Ethernet driver 506 performs line decoding of a signal received from a corresponding remote RF unit 108, among the plurality of remote RF units 108, through the twisted pair cable, and outputs to the traffic shaper 504.

The PLL clock restoring unit 508 performs wave-shaping of a clock which is extracted from a signal having the remote RF unit frames by the first Ethernet driver 502, the signal having been received from a corresponding remote RF unit hub 104, among the plurality of remote RF unit hubs 104, and restores a transmission clock. The transmission clock was provided for the traffic shaper 504 and the second Ethernet driver 506. Accordingly, the remote RF unit repeater 106, like the digital modem unit 102, processes and transmits data in sync with a transmission clock which is generated from the GPS unit 316 of the digital modem unit 102.

Figure 6:
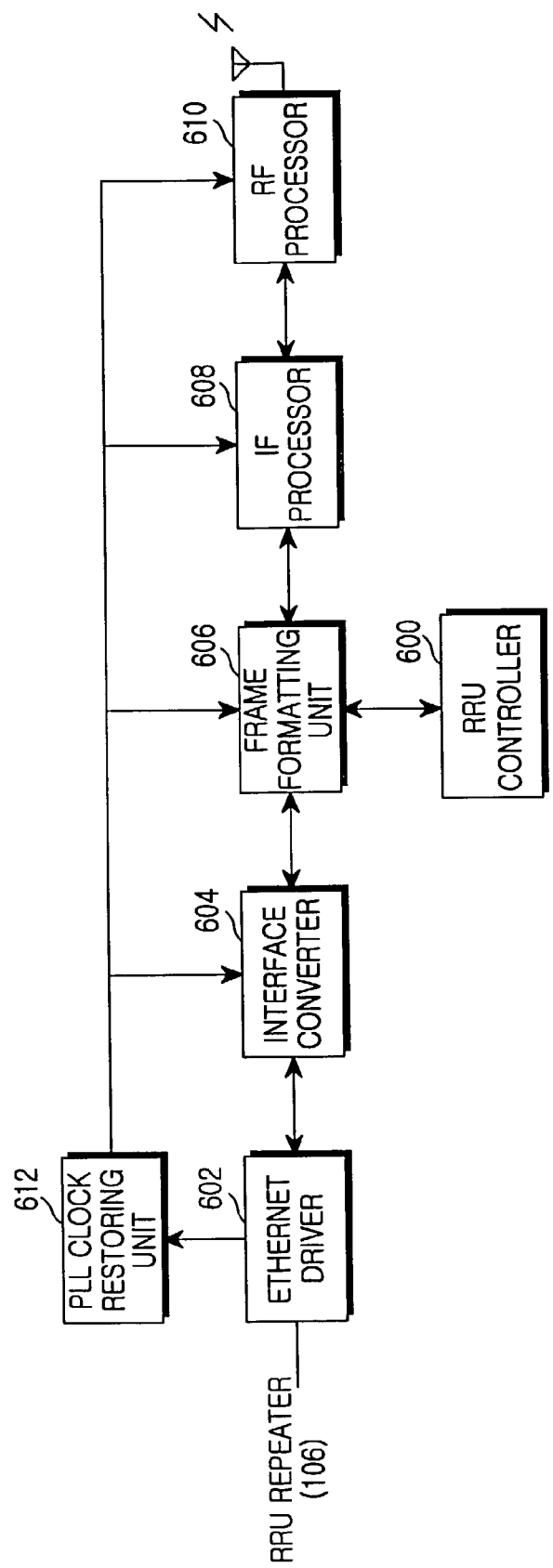
FIG. 6 is a block diagram showing a configuration of a remote RF unit in accordance with the invention.

FIG. 6 is a block diagram showing a configuration of a remote RF unit (RRU) 108 in accordance with the invention, upon adoption of Ethernet with a 100Base-T form. The remote RF unit 108 comprises a remote RF unit controller 600, an Ethernet driver 602, an interface converter 604, a frame formatting unit 606, a intermediate frequency (IF) processor 608, an RF processor 610, and a PLL clock restoring unit 612.

The Ethernet driver 602 performs line decoding of a signal received from a corresponding remote RF unit repeater 106, among the plurality of remote RF unit repeaters 106, through the twisted pair cable, and outputs to the interface converter 604. On the other hand, the Ethernet driver 602 performs line coding of data received from the interface converter 604, and transmits the line coded data to a corresponding remote RF unit repeater 106, among the plurality of remote RF unit repeaters 106, through the twisted pair cable.

The interface converter 604 performs descrambling of data received from the Ethernet driver 602 and performs 4B/5B decoding, and outputs a remote RF unit frame to the frame formatting unit 606. On the other hand, the interface converter 604 performs 4B/5B coding of a remote RF unit frame received from the frame formatting unit 606, performs scrambling, and outputs the scrambled frame to the Ethernet driver 602.

The frame formatting unit 606 performs deframing of a remote RF unit frame received from interface converter 604, according to the frame format for transmission of FIG. 2, and outputs traffic data of a baseband to the IF processor 608. On the other hand, the frame formatting unit 606 performs framing of traffic data of a baseband received from the IF processor 608, according to the frame format for transmission of FIG. 2, and outputs a remote RF unit frame to the interface converter 604.

The remote RF unit controller 600 interprets and achieves a command based on control data, the control data being present when a control address in a control frame designates the remote RF unit controller 600 itself, and reports the result to the digital modem unit 102, using a control frame which is deframed by the frame formatting unit 606.

The IF processor 608 converts traffic data of a baseband received from the frame formatting unit 606 to an IF signal, and outputs the IF signal to the RF processor 610. On the other hand, the IF processor 608 converts an IF signal received from the RF processor 610 to traffic data of a baseband, and outputs to the frame formatting unit 606.

The RF processor 610 modulates an IF signal to an RF signal, and transmits the RF signal to the mobile terminal 110 through an antenna. On the other hand, the RF processor 610 converts the RF signal to a IF signal, the RF signal being received from the mobile terminal 110 through an antenna, and outputs to the IF signal to the IF processor 608.

The PLL clock restoring unit 612 performs wave-shaping of a clock which is extracted from a signal having the remote RF unit frames, the signal having been received from a corresponding remote RF unit repeater 106, among the remote RF unit repeaters 106, and restores a transmission clock. The transmission clock is provided for the interface converter 604, frame formatting unit 606, IF processor 608, and RF processor 610. Accordingly, the remote RF unit 108, like the digital modem unit 102, processes and transmits data in sync with a transmission clock which is generated from the GPS unit 316 of the digital modem unit 102.

As described above, the Ethernet driver 314 in the digital modem unit 102, the first and second Ethernet drivers 402 and 416 in the remote RF unit hub 104, the first and second Ethernet drivers 502 and 506 in the remote RF unit repeater 106, and the Ethernet driver 602 in the remote RF unit 108 perform line coding and line decoding using MLT-3 encoding for 100Base-T.

The interface converter 312 in the digital modem unit 102, the first and second interface converters 404 and 414 in the remote RF unit hub 104, and the interface converter 604 in the remote RF unit 108 perform 4B/5B coding and decoding according to the encoding method described above for 100Base-T.

Scrambling and descrambling use a pseudo noise (PN) code having a period of 4095 ($=2^{12}-1$). The MLT-3 encoding method for line coding and decoding, the 4B/5B coding and decoding, and the scrambling and descrambling are performed on a PHY (physical layer interface) chip in the Ethernet using a common 100Base-T standard. On the other hand, the invention adopts an independent frame format for transmission, as described above. Since common PHY chips cannot be used in the invention, the Ethernet drivers 314, 402, 416, 502, 506 and 602 and interface converters 312, 404, 414 and 604 are additionally included. Despite this, common PHY chips may be made to only perform a function as Ethernet drivers, without an additional configuration for the Ethernet drivers 314, 402, 416, 502, 506 and 602. The frame formatting unit 310 in the digital modem unit 102, the first and second frame formatting units 406 and 412 in the remote RF unit hub 104, and the frame formatting unit 606 in the remote RF unit 108 are implemented using a field programmable gate array (FPGA) to perform framing and deframing according to the frame format for transmission of FIG. 2.

Hereinafter follows a description of a signal transmission procedure in the base station system according to the embodiment of the invention, where the signal to be transmitted from the base station controller 100 to the mobile terminal 110 is received in the digital modem unit 102 and transmitted to the mobile terminal 110 through the remote RF unit hub 104 via a corresponding remote RF unit repeater 106 and remote RF unit 108.

The signal from the base station controller 100, which is received by the baseband modulator/demodulator 302, is demodulated by the plurality of baseband modems 304 according to respective channels. The demodulated baseband traffic data samples are outputted to the data receiver 306. The data receiver 306 receives the traffic data samples. The received traffic data are temporarily stored in memory for data storage 308 so it can be processes without loss, and the data is outputted in series to the frame formatting unit 310. The series of data from the data receiver 306, which is received by the frame formatting unit 310, are framed according to the frame format for transmission of FIG. 2, and a remote RF unit frame is outputted to the interface converter 312.

At this time, the frame formatting unit 310 outputs a control frame, according to the frame format for transmission of FIG. 2, the control frame being generated under the control of the digital modem unit controller 300, as well as traffic frames, to the interface converter 312. The remote RF unit frame data, which is transferred to the interface converter 312 in such a way, are 4B/5B encoded and scrambled. The scrambled signal is line coded by the Ethernet driver 314, and transmitted to the corresponding remote RF unit hub among the plurality of remote RF unit hubs, via the twisted pair cable.

Then, the signal in the remote RF unit hub 104, which is received from the digital modem unit 102 via the twisted pair cable, is line decoded by the first Ethernet driver 402. The line decoded signal is transferred to the first interface converter 404 and is descrambled and 4B/5B decoded and output as a decoded remote RF unit frame to the first frame formatting unit 406. The first frame formatting unit 406 then deframes the decoded remote RF unit frame according to the frame format for transmission of FIG. 2, and outputs a deframed signal (data) to the multiplexing unit 408. The multiplexing unit 408 distributes the data to the plurality of remote RF unit connection units 410.

At this time, as the foregoing example, if one remote RF unit hub 104 is connected to eight remote RF units 108, and each remote RF unit 108 is assigned one traffic frame, the multiplexing unit 408 distributes the traffic frames among the series of remote RF unit frames to the remote RF unit connection units 410 corresponding to each remote RF unit 108 one by one in order.

The distributed data are again framed by the second frame formatting unit 412, according to the frame format for transmission of FIG. 2. The remote RF unit frame is outputted to the second interface converter 414, and the outputted data are 4B/5B coded and scrambled. The scrambled signal is line coded by the second Ethernet driver 416, and transmitted to the remote RF unit repeater which is connected to corresponding remote RF unit among the plurality of remote RF units 108 via the twisted pair cable.

In the remote RF unit repeater 106, the signal, which is received from the corresponding remote RF unit hub 104 among the plurality of remote RF unit hubs 104 via the twisted pair cable, is line decoded by the first Ethernet driver 502, and the line decoded data are outputted to the traffic shaper 504. Any data distorted in a course of transmission are restored, waveform-shaped and amplified by the traffic shaper 504. The amplified data are line coded by the second Ethernet driver 506, and transmitted to the corresponding remote RF unit 108, among the plurality of the remote RF units 108, via the twisted pair cable. At this time, for restoring, waveform-shaping and amplification of the data, the traffic shaper 504 deframes the remote RF unit frame, not followed by framing of the data. As a result, only restoration, waveform-shaping and amplification of the data are performed, thereby minimizing time delay caused by a relay.

In the remote RF unit 108 which is connected to the remote RF unit repeater 106 via the twisted pair cable, the signal transmitted from the remote RF unit repeater 106 is line decoded by the Ethernet driver 602, and the line decoded signal is outputted to the interface converter 604. The line decoded signal is descrambled by the interface converter 604, 4B/5B decoded, and the remote RF unit frame is outputted to the frame formatting unit 606. The frame formatting unit 606 deframes the remote RF unit frame, which is received from the interface converter 604, according to the frame format for transmission of FIG. 2, and baseband traffic data are outputted to the IF processor 608. The baseband traffic data, which is transferred to the IF processor 608, are converted to an IF signal. The IF signal is provided to the RF processor 610 which converts the IF signal to an RF signal, and transmits the RF signal to the mobile terminal 110 through an antenna.

Hereinafter follows a description of an opposite procedure of signal transmission, with respect to the above, where the signal to be transmitted from the mobile terminal 110 to the base station controller 100 through the corresponding remote RF unit 108 among the plurality of remote RF units 108, the remote RF unit repeater 106, the remote RF unit hub 104 and the digital modem unit 102 prior to being received by the base station controller 100.

The RF signal transmitted from the mobile terminal 110 to the remote RF unit 108 is converted to an IF signal in the RF processor 610, and the IF processor 608 converts the IF signal to baseband traffic data. The baseband traffic data are outputted to the frame formatting unit 606 and are framed into a remote RF unit frame according to the frame format for transmission of FIG. 2. The remote RF unit frame is 4B/5B coded by the interface converter 604 and scrambled. The scrambled signal is line coded by the Ethernet driver 602 and transmitted to the corresponding remote RF unit repeater 106 among the plurality of remote RF unit repeaters 106 via the twisted pair cable.

In the second Ethernet driver 506 of the remote RF unit repeater 106, the signal received from the remote RF unit 108 via the twisted pair cable is line decoded, and the data are outputted to the traffic shaper 504. The data outputted to the traffic shaper 504 are restored, waveform-shaped and amplified. The amplified data are line coded by the first Ethernet driver 502, and transmitted to the corresponding remote RF unit hub 104 among the plurality of the remote RF unit hubs 104 via the twisted pair cable. At this time, the traffic shaper 504 performs only restoration, waveform-shaping and amplification of the data, thereby minimizing time delay caused by a relay.

The signal transmitted from the remote RF unit repeater 106 to the remote RF unit hub 104, as described above, is line decoded by the second Ethernet driver 416 of the remote RF unit connection unit 410. The line decoded signal is descrambled by the second interface converter 414 and 4B/5B decoded. The decoded signal is deframed in the second frame formatting unit 412, according to the frame format for transmission, and transferred to the multiplexing unit 408. The multiplexing unit 408 performs multiplexing of the data which is inputted from the respective second frame formatting units 412 of the plurality of remote RF unit connection units 410, and outputs the multiplexed data to the first frame formatting unit 406. At this time, as the foregoing example, if one remote RF unit hub 104 is connected to eight remote RF units 108, and each remote RF unit 108 is assigned one traffic frame, the multiplexing unit 408 perform multiplexing of data of every remote RF unit connection units 410 corresponding to respective remote RF units 108, to respectively make them correspond to one traffic frame. Then, the first frame formatting unit 406 performs framing of the data, which is received from the multiplexing unit 408, according to the frame format for transmission in FIG. 2, and the remote RF unit frame is outputted to the first interface converter 404. The remote RF unit frame transferred to the first interface converter 404 is 4B/5B coded and scrambled. The scrambled signal is line coded by the first Ethernet driver 402, and transmitted to the digital modem unit 102 via the twisted pair cable.

The signal transmitted to the digital modem unit 102 is line decoded by the Ethernet driver 314, descrambled and 4B/5B decoded by the interface converter 312. The decoded signal is deframed by the frame formatting unit 310, according to the frame format for transmission in FIG. 2, and outputted to the data receiver 306. At this time, the frame formatting unit 310 extracts the control address and control data with the control frame and provides them to the digital modem unit controller 300. The traffic data outputted to the data receiver 306 are modulated according to respective channels by the plurality of the baseband modems 304 in the baseband modulator/demodulator 302. The modulated signal is transmitted to the base station controller 100.

In the base station system according to the invention, the digital modem unit 102, remote RF unit hub 104 and remote RF unit 108 are interconnected through Ethernet, and the base station system adopts the independent frame format for transmission which is specified to be a series of frames, instead a data format specified in Ethernet or an upper level of Ethernet. Accordingly, the base station system of the invention makes it possible to transmit a high quality of signal between the digital modem unit 102 and the remote RF unit 108 via Ethernet.

Unlike base station systems comprising conventional repeater systems using optical lines or coaxial cables, the base station system of the invention adopts Ethernet using twisted pair cables, making it possible to install many more remote RF units cheaply and easily, thereby being able to flexibly extend coverage. Namely, if it is necessary to extend a sector or FA (Frequency Allocation), as many as necessary remote RF units and remote RF unit hubs which are connected to remote RF units in groups can be connected to the digital modem unit using twisted pair cables.

In addition, if it is necessary to extend a wireless channel capacity, the configuration of the base station system comprising the digital modem unit 102, remote RF unit hub 104 and remote RF unit 108 can be extended for connection to the base station controller 100. Moreover, the clock necessary for a high rate of data transmission can be transmitted in a high quality state to the remote RF unit hub 104, remote RF unit repeater 106 and remote RF unit 108, thereby enabling transmission of a high rate of data in an efficient manner.

As is apparent from the above description, according to the present invention, the base station adopting Ethernet using twisted pair cables has an advantage in that a high quality of signal can be transmitted between the base station and the remote RF unit (RRU), through a line which can be installed cheaply and easily, the remote RF unit being installed remotely from the base station, the remote RF unit transceiving the RF signal with the mobile terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Especially, although the embodiments of the invention include Ethernet adopting a 100Base-T standard, gigabit Ethernet such 1000Base-T, as well as 10Base-T, may be adopted. If the Ethernet standard is different from the case of the invention, a data coding method changes. Accordingly, respective interface converters and Ethernet drivers in the digital modem unit 102, remote RF unit hub 104, remote RF unit 108, and remote RF unit repeaters, and Ethernet drivers in the remote RF unit repeaters 106 can be changed. Thus, the scope of the invention should be determined not by embodiments but by claims and equivalents thereof.

What is claimed is:

1. A base station system for mobile communication between a mobile terminal and a base station controller connected to a mobile exchange network, said base station system comprising:

a digital modem unit for receiving a signal to be transmitted to said mobile terminal from said base station controller, framing the received signal according to a frame format for transmission, said frame format being different from an Ethernet specified data format, said frame format being a predetermined remote Radio Frequency (RF) unit frame set to be in series, said digital modem unit transmitting a plurality of said remote RF unit frames in series over an Ethernet using twisted pair cable;

at least one remote RF unit hub receiving said remote RF unit frames transmitted by said digital modem unit and distributing the received remote RF unit frames to a plurality of remote RF units via the Ethernet using twisted pair cable; and said plurality of remote RF units producing a deframed signal by deframing the remote RF unit frames received from the remote RF unit hub, modulating the deframed signal to an RF signal, and transmitting the RF signal to the mobile terminal, said plurality of remote RF units receiving an RF signal transmitted by said mobile terminal, each one of said remote RF unit converting the received RF signal into an intermediate frequency (IF) signal, framing said IF signal according to a frame format for transmission to form a corresponding remote RF unit frame and transmitting the corresponding remote RF unit frame to said at least one remote RF unit hub via the Ethernet using twisted pair cable, said remote RF unit hub multiplexing each of said corresponding remote RF unit frames transmitted by said remote RF units and transmitting a plurality of said remote RF unit frames in series over the Ethernet using twisted pair cable to said digital modem unit, and said digital modem unit producing a deframed signal by deframing the remote RF unit frames received from the remote RF unit hub and transmitting the deframed signal to the base station controller.

2. The base station system as set forth in claim 1, further comprising at least one remote RF unit repeater connected between said at least one remote RF unit hub and one of said plurality of remote RF units through the Ethernet using twisted pair cable, said remote RF unit repeater performing restoration, wave-shaping and amplification of the remote RF unit frame transmitted between the at least one remote RF unit hub and said one of said plurality of remote RF units.

3. The base station system as set forth in claim 1, said digital modem unit comprising:

a baseband modulator/demodulator receiving said signal to be transmitted to said mobile terminal from said base station controller and producing demodulated baseband traffic data;

a data receiver receiving said baseband traffic data, temporarily storing said baseband traffic data in a memory to prevent loss, and outputting said baseband traffic data in series;

a frame formatting unit receiving said baseband traffic data output by said data receiver and, according to said frame format for transmission and to produce said plurality of remote RF unit frames in series;

an interface converter coding said remote RF unit frames according to 4B/5B coding and outputting 4B/5B coded remote RF unit frames; and an Ethernet driver line coding said 4B/5B coded remote RF unit frames for transmission over said Ethernet using twisted pair cable to said at least one remote RF unit hub.

4. The base station system as set forth in claim 3, further comprising at least one remote RF unit repeater connected between said at least one remote RF unit hub and one of said plurality of remote RF units through the Ethernet using twisted pair cable, said remote RF unit repeater performing restoration, wave-shaping and amplification of the remote RF unit frame transmitted between the at least one remote RF unit hub and said one of said plurality of remote RF units.

5. The base station system as set forth in claim 1, said digital modem unit further comprising:

an Ethernet driver line decoding the remote RF unit frames received from the remote RF unit hub and outputting line decoded signals;

an interface converter decoding, according to 4B/5B coding, said line decoded signals and outputting 4B/5B decoded remote RF unit frames;

a frame formatting unit deframing, according to said frame format for transmission, said 4B/5B decoded remote RF unit frames and outputting baseband traffic data;

a data receiver receiving said baseband traffic data, temporarily storing said baseband traffic data in a memory to prevent loss, and outputting said baseband traffic data; and a baseband modulator/demodulator receiving said baseband traffic data and producing modulated baseband traffic data to be transmitted to said base station controller.

6. The base station system as set forth in claim 3, said digital modem unit further comprising a global positioning system receiving time and clock information for synchronous generation of a transmission clock signal, said the digital modem unit processing and transmitting data synchronously in response to said transmission clock signal.

7. The base station system as set forth in claim 6, said transmission clock signal having a 25 MHz frequency depending on a 100Base-T standard.

8. The base station system as set forth in claim 1, said at least one remote RF unit hub comprising:
a first Ethernet driver line decoding a signal comprising said plurality of said remote RF unit frames received from the digital modem unit through the twisted pair cable, and outputting a line decoded signal;
a first interface converter 4B/5B decoding the line decoded signal, and outputting the remote RF unit frames;
a first frame formatting unit deframing the remote RF unit frames output from the first interface converter according to the frame format for transmission, and outputting deframed data;
a multiplexing unit distributing the deframed data to a plurality of remote RF unit connection units;
each of the remote RF unit connection units being connected to corresponding ones of said remote RF units, each of the remote RF unit connection units framing the deframed data received from the multiplexing unit according to the frame format for transmission to output the remote RF unit frames, 4B/5B coding the output remote RF unit frames and line coding said 4B/5B coded remote RF unit frames for transmission to said corresponding ones of said remote RF units via the Ethernet using said twisted pair cable; and
a remote RF unit hub controller controlling the distribution performed by the multiplexing unit.

9. The base station system as set forth in claim 8, each of said remote RF unit connection units including:
a second frame formatting unit framing the deframed data received from the multiplexing unit according to the frame format for transmission to output the remote RF unit frames;
a second interface converter 4B/5B coding the output remote RF unit frames received from the second frame formatting unit; and
a second Ethernet driver line coding said 4B/5B coded remote RF unit frames for transmission to said corresponding one of said remote RF units via the Ethernet using said twisted pair cable.

10. The base station system as set forth in claim 8, said digital modem unit further comprising a global positioning system receiving time and clock information for synchronous generation of a transmission clock signal, said the digital modem unit processing and transmitting data synchronously in response to said transmission clock signal; and
said at least one remote RF unit hub further comprising a phase locked loop clock restoring unit generating a restored transmission clock signal in response to a clock signal extracted by said first Ethernet driver from said remote RF unit frames received from the digital modem unit, said restored transmission clock signal being applied to said first interface converter, said first frame formatting unit and said remote RF unit connection units.

11. The base station system as set forth in claim 10, said transmission clock signal and said restored transmission clock signal having a 25 MHz frequency depending on a 100Base-T standard.

12. The base station system as set forth in claim 1, said at least one remote RF unit hub comprising:
a plurality of remote RF unit connection units being connected to corresponding ones of said remote RF units, each of said remote RF unit connection units including:
a second Ethernet driver line decoding the remote RF unit frames received from the remote RF unit and outputting line decoded signals;
a second interface converter decoding, according to 4B/5B coding, said line decoded signals and outputting 4B/5B decoded remote RF unit frames; and
a second frame formatting unit deframing, according to said frame format for transmission, said 4B/5B decoded remote RF unit frames and outputting traffic data;
a multiplexing unit outputting multiplexed data by multiplexing the traffic data output from the second frame formatting unit under the control of a remote RF unit hub controller;
a first frame formatting unit producing, from the multiplexed data, a plurality of remote RF unit frames in series according to said frame format for transmission;
a first interface converter coding said remote RF unit frames according to 4B/5B coding and outputting 4B/5B coded remote RF unit frames; and
a first Ethernet driver line coding said 4B/5B coded remote RF unit frames for transmission over said Ethernet using twisted pair cable to said digital modem unit.

13. The base station system as set forth in claim 1, each of said remote RF units comprising:
an Ethernet driver line decoding a signal comprising said plurality of said remote RF unit frames received from the remote RF unit hub through the twisted pair cable, and outputting a line decoded signal;
an interface converter 4B/5B decoding the line decoded signal, and outputting the remote RF unit frames;
a frame formatting unit deframing the remote RF unit frames output from the first interface converter according to the frame format for transmission, and outputting traffic data of a baseband;
an IF (intermediate frequency) processor converts traffic data of a baseband received from the frame formatting unit to an IF signal; and
an RF processor modulating the IF signal to an RF signal, and transmitting the RF signal to the mobile terminal through an antenna.

14. The base station system as set forth in claim 1, each of said remote RF units comprising:
an RF processor receiving the RF signal transmitted by said mobile terminal and converting the received RF signal into an intermediate frequency (IF) signal;
an IF processor converting the IF signal received from the RF processor to traffic data of a baseband;
a frame formatting converting the traffic data of a baseband into a remote RF unit frame according to said frame format for transmission;
an interface converter coding said remote RF unit frame according to 4B/5B coding and outputting a 4B/5B coded remote RF unit frame; and
an Ethernet driver line coding said 4B/5B coded remote RF unit frame for transmission over said Ethernet using twisted pair cable.

15. The base station system as set forth in claim 1, wherein the remote RF unit frames are divided into:
a traffic frame for use in transmitting traffic data, which is transmitted and received by the mobile terminal; and a control frame for use in transmitting a control address and control data, the control address differentiating the plurality of remote RF units from one another, the control data containing a command to control operation and functions of the plurality of remote RF units.

16. The base station system as set forth in claim 13, said digital modem unit further comprising a global positioning system receiving time and clock information for synchronous generation of a transmission clock signal, said the digital modem unit processing and transmitting data synchronously in response to said transmission clock signal; and each of said remote RF units further comprising a phase locked loop clock restoring unit generating a restored transmission clock signal in response to a clock signal extracted by said Ethernet driver from said remote RF frames received from the remote RF unit hub, said restored transmission clock signal being applied to said interface converter, said frame formatting unit, said IF processor and said RF processor.

17. The base station system as set forth in claim 16, said transmission clock signal and said restored transmission clock signal having a 25 MHz frequency depending on a 100Base-T standard.

18. The base station system as set forth in claim 1, further comprising at least one remote RF unit repeater connected between said at least one remote RF unit hub and one of said plurality of remote RF units through the Ethernet using twisted pair cable, said remote RF unit repeater comprising:

a first Ethernet driver line decoding a signal comprising said plurality of said remote RF unit frames received from the remote RF unit hub through the twisted pair cable, and outputting a line decoded signal;

a traffic shaper restoring, wave-shaping and amplifying the line decoded signal output by the first Ethernet driver, and outputting amplified data; and a second Ethernet driver line coding the amplified data.

19. The base station system as set forth in claim 18, said digital modem unit further comprising a global positioning system receiving time and clock information for synchronous generation of a transmission clock signal, said the digital modem unit processing and transmitting data synchronously in response to said transmission clock signal; and said remote RF unit repeater further comprising a phase locked loop clock restoring unit generating a restored transmission clock signal in response to a clock signal extracted by said first Ethernet driver from said remote RF frames received from the remote RF unit hub, said restored transmission clock signal being applied to said traffic shaper and said second Ethernet driver.

20. The base station system as set forth in claim 19, said transmission clock signal and said restored transmission clock signal having a 25 MHz frequency depending on a 100Base-T standard.

21. The base station system as set forth in claim 1, further comprising at least one remote RF unit repeater connected between said at least one remote RF unit hub and one of said plurality of remote RF units through the Ethernet using twisted pair cable, said remote RF unit repeater comprising:

a second Ethernet driver line decoding a signal comprising said plurality of said remote RF unit frames received from the remote RF unit through the twisted pair cable, and outputting a line decoded signal;

a traffic shaper restoring, wave-shaping and amplifying the line decoded signal output by the second Ethernet driver, and outputting amplified data; and a first Ethernet driver line coding the amplified data.

22. The base station system as set forth in claim 1, further comprising each one of said remote Radio Frequency (RF) unit frames comprising:

a synchronous field loading 1-bit of super frame synchronous (SFS) bit;

a data field loading 17-bit frame data; and a cyclic redundancy check (CRC) field loading a 7-bit cyclic redundancy check value.

* * * * *